United States Patent

Dodd et al.

[11] 4,022,081
[45] May 10, 1977

[54] BRACKET FOR A BRAKE PEDAL

[75] Inventors: Thomas E. Dodd; James B. Putt, both of South Bend, Ind.

[73] Assignee: The Bendix Corporation, South Bend, Ind.

[22] Filed: Dec. 24, 1975

[21] Appl. No.: 644,246

[52] U.S. Cl. .................................. 74/512; 74/560
[51] Int. Cl.² ........................................ G05G 1/14
[58] Field of Search ............... 74/512, 474, 478.5, 74/478, 560, 562, 562.5; 188/209; 403/388, 363, 345

[56] References Cited
UNITED STATES PATENTS

| | | | |
|---|---|---|---|
| 3,282,125 | 11/1966 | Dully | 74/512 X |
| 3,388,610 | 6/1968 | Pyle et al. | 74/512 |
| 3,400,607 | 9/1968 | Smith | 74/562.5 X |

*Primary Examiner*—Samuel Scott
*Assistant Examiner*—Frank H. McKenzie, Jr.
*Attorney, Agent, or Firm*—Leo H. McCormick, Jr.; Ken C. Decker

[57] ABSTRACT

A pedal adapter for maintaining the connection between a push rod and a brake lever in a plane perpendicular to and at a fixed radius from a pin. The lever adjacent the pedal adapter is offset at an angle to avoid interference with a stationary member.

4 Claims, 3 Drawing Figures

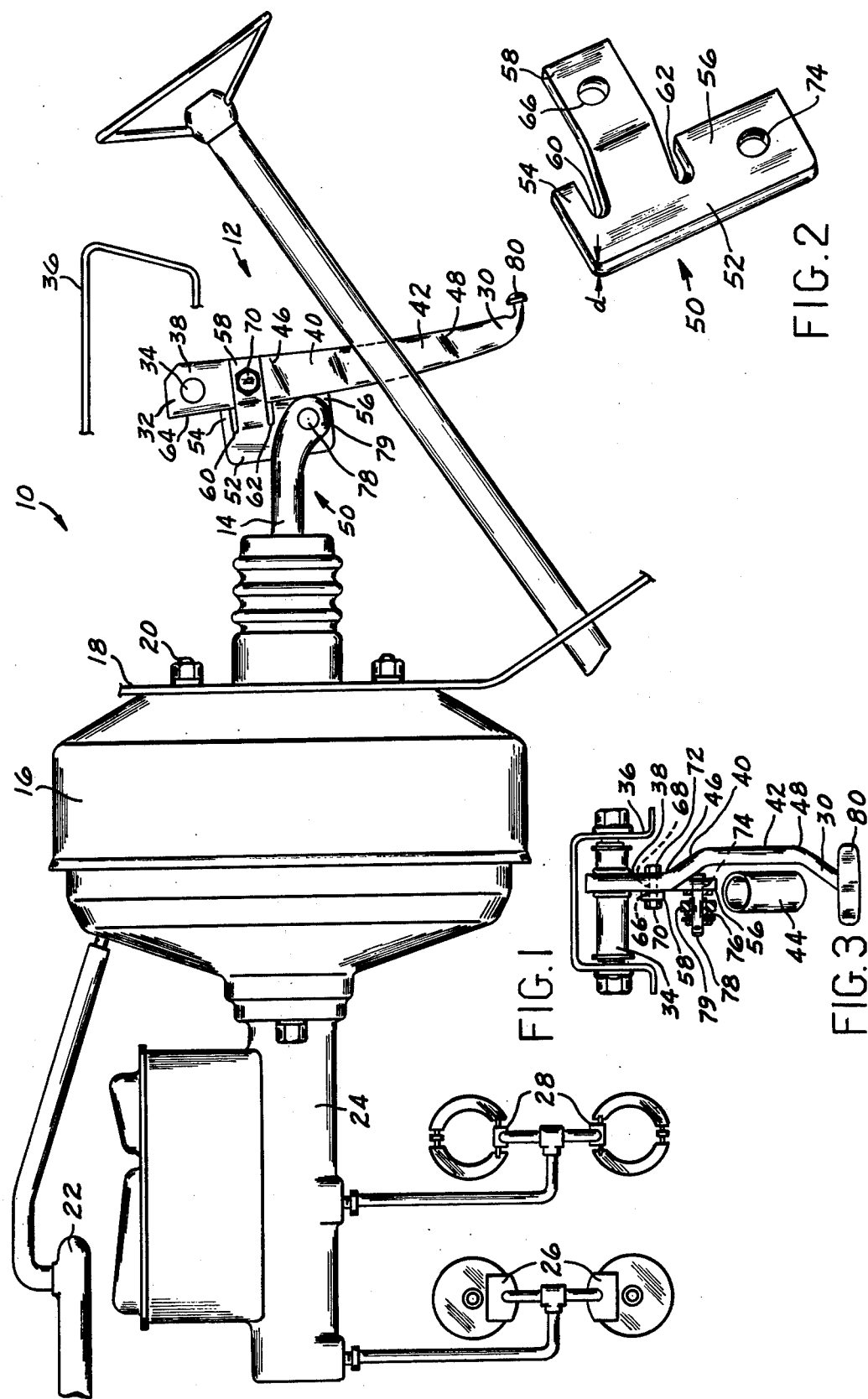

BRACKET FOR A BRAKE PEDAL

BACKGROUND OF THE INVENTION

U.S. Pats. Nos. 3,486,389 and 3,356,189 disclose linkage mechanisms whereby the input from a brake pedal can be modified to provide a servomotor with an operational force, even though several obstructions make it impossible to provide a direct connection therebetween. Unfortunately, constructional changes in the firewall and the reduction in over-all length of the dash section of currently proposed vehicles have made such linkage mechanisms obsolete. In addition, the clearance between the steering column and the mounting pin of the pedal have also been reduced resulting in a brake pedal which requires several angular bends in place of the conventional straight brake lever previously utilized by such vehicles.

SUMMARY OF THE INVENTION

We have devised an adapter means for use with a brake pedal whereby the input force from an operator is directly transmitted to a push rod even though the lever arm of the brake pedal is offset or bent to avoid interference with the steering column and other components under the dash. The adapter means is a bracket having a rectangular body with a first support surface separated from a second support surface by a mounting surface. The mounting surface is offset from the rectangular body by an amount which will permit the first and second support surfaces to be aligned with the face of the lever when the mounting surface is flush with the side of the lever. A fastener extends through the mounting surface and the side of the lever to affix the first and second support surfaces against the face of the lever. The lever has a first end pivotally secured to the body of the vehicle and a second end free to move in an arcuate path. The second support surface engages the face of the lever and extends in a plane perpendicular to the pivotal mounting of the lever. The angle of the bend in the lever required to avoid interference with the steering column can occur any time after the initial contact of the second support surface with the face of the lever since a triangular lock will be achieved between the first support surface, the fastener, and the second support surface. The second support surface is connected to the push rod of the master cylinder. Any input force applied to the second end of the lever arm rotates the lever around the pivotally connected first end and imparts a linear force which moves a push rod to generate an operational force for the master cylinder.

It is therefore the object of this invention to provide a brake pedal with an adapter means which allows the lever arm of the brake pedal to be bent and avoid obstructions to permit an output force to be transmitted in a plane perpendicular to and at a constant radius from a pivotal connection of the lever arm.

It is another object of this invention to provide a brake pedal with a bracket means for changing a brake pedal from a lever ratio associated with a manual input to a lever ratio associated with a power assist input through the attachment of an adapter to a lever arm which is bent to avoid interference with other components located in the mounting area.

It is another object of this invention to provide a brake pedal with a mounting bracket which shifts a fastener position of a push rod in a plane parallel to a pivotally positioned lever and a constant radius from the pivotal mounting pin even though the lever is bent to avoid the steering column in the vehicle.

These and other objects of this invention will become obvious from reading this specification and viewing the drawing.

BRIEF DESCRIPTION OF THE DRAWING

FIG. 1 is a schematic illustration of a braking system located in a vehicle having a brake pedal adapter for positioning a push rod to avoid a steering column in the vehicle.

FIG. 2 is a prospective view of the pedal adapter.

FIG. 3 is an end view showing the relationship between the brake pedal and the steering column of the vehicle.

DETAILED DESCRIPTION OF THE PREFERRED EMBODIMENT

In the drawing in FIG. 1, a power brake system 10 has a brake pedal means 12 connected to a push rod 14 for imparting an operational input to servomotor 16. The servomotor 16 is attached to the firewall 18 of the vehicle through bolts 20. The servomotor 16 of a well-known type such as illustrated in U.S. Pat. No. 3,106,873, has a wall means located in a cavity therein. The wall means is normally suspended in a vacuum created at the engine intake manifold 22 of the vehicle.

The servomotor 16 is connected to a master cylinder 24. The master cylinder 24 is connected to the front brakes 26 and the rear brakes 28 of the vehicle. In response to an operator input force, the servomotor 16 supplies an operational force to operate the master cylinder 24 and generate a pressure force to operate the front wheel brakes 26 and the rear wheel brakes 28.

In more particular detail, the brake pedal means 12 has a lever arm 30 with a first end 32 pivotally attached by pin 34 to the body 36 of the vehicle. The lever arm 30 has a first section 38 which extends in a plane perpendicular to the pin 34, and a second section 40 which is bent on an angle from the first section 38 to position a third section 42 adjcent the steering column 44 (see FIG. 3). The third section 42 can be entirely parallel to the first section 38, or rebent to align the second end of the lever 30 in a plane substantially parallel to a radial arc extending from pin 34 through the first section 38, as shown in FIG. 3. The angle 46 at which second section 40 and the angle 48 at which the third section 42 is bent permits the lever arm 30 to assume a rest position and a fully applied position without engaging the steering column 44.

The lever arm 30 is connected to push rod 14 through a bracket means 50, shown in FIG. 2. The bracket means 50 has a rectangular body 52 with a first support surface 54 separated from a second support surface 56 by a mounting surface 58. A first slot 60 and a second slot 62 are cut into the rectangular body to a depth which allows the mounting surface 58 to be offset a full thickness width $d$. The first support surface 54 and the second support surface 56 will be aligned with the face 64 of the first section 38 of the lever arm 30 and the mounting surface 58 will be positioned flat against the side of the first section 38. The mounting surface 58 has a bore or hole 66 located in the center thereof which is aligned with bore 68 in the first section 38 of the lever arm 30. A bolt or other fastener means 70 extends through the bores 66 and 68. A nut 72 is attached to bolt 70 to secure the bracket means 50 to the lever arm 30. The rectangular body 52 has a bore or hole 74 parallel to bore 68 in the lever arm 30. A pin 78 extends through hole 74 and sleeve 76 on the end 79 of push rod 14. The hole 74 is located at constant radial distance from pin 34. Any input force applied to pedal pad 80 will be amplified by the ratio of the distance from pad 80 to pin 34 to the distance from pin 78 to pin 34.

MODE OF OPERATION OF THE PREFERRED EMBODIMENT

In a vehicle equipped with a braking system 10, as shown in FIG. 1, the lever arm 30 will assume a position as shown in FIG. 1, when the brakes are released. In the rest position, the angle 46 is substantially parallel to the steering column 44 to prevent interference between the lever arm 30 and the steering column 44. When an operator applies an input force to pad 80, the lever arm 30 pivots around pin 34 causing pin 78 to rotate in a constant arc about pin 34. The end 79 of the push rod 14 rotates in sleeve 76 to convert the arcuate rotation about pin 34 into linear motion to move push rod 14. Movement of push rod 14 supplies the servomotor 16 with an actuation signal. A pressure differential will be created in the servomotor 16 corresponding to the input force applied to the pad 80. The pressure differential develops an output force which moves a piston in the master cylinder 24 and develops a hydraulic pressure to operate the front brakes 26 and the rear brakes 28.

If the input force from the operator to pedal 30 is sufficient to completely activate the servomotor 16, the lever arm 30 will be rotated to a point where the angle 48 of the bend to align pad 80 with section 38 will be parallel to the steering column 44. Thus, the lever arm 30 can be rotated through an entire operational sequence without any interference with the steering column 44.

WE CLAIM:

1. A pedal adapter for transmitting an operational input force from an operator to a push rod; said pedal adapter comprising:
    lever means having a first end pivotally connected to a support and a second end, said lever means having a first section perpendicularly extending from said support to a second section, said second section being offset at an angle from said first end to avoid interference with a stationary column, said second section being connected to a third section substantially parallel to said first section, said third section extending to and including said second end, said first section having a first bore extending therethrough;
    bracket means having a rectangular body with a first support surface separated from a second support surface by a mounting surface, said mounting surface being offset from said rectangular body to align said first support and said second support with the face of the first section of the lever means, said second support surface having a second bore therein, said mounting surface having a third bore therein; and
    fastener means extending through said third bore in the mounting surface and the first bore of the first section of the lever means for holding said first support surface and said second support surface against the face of said frist section of the lever means to locate the second bore at a continuous radius from the pivotal connection of the first end of the lever means.

2. The pedal adapter, as recited in claim 1, wherein said second support surface on the bracket means effectively extends the first section of the lever means past the second section in order that the input force can be directly transmitted to the push rod at an effective amplification ratio.

3. The pedal adapter, as recited in claim 2, wherein said bracket means includes:
    a first slot located between the first support surface and the mounting surface; and
    a second slot located between the second support surface and the mounting surface, said first slot and said second slot permitting said offset of the mounting surface to occur in the slot depth in order that the remaining portion of the mounting surface lies flat against the side of the first section of the lever means.

4. The pedal adapter, as recited in claim 3, further including:
    pin means extending through said second bore in the second support surface; and
    sleeve means located on the pin means and connected to the push rod to pivot and transmit a linear input when the lever means moves in an arc about the pivotal connection.

* * * * *